United States Patent
Dogan et al.

(10) Patent No.: US 12,014,143 B2
(45) Date of Patent: Jun. 18, 2024

(54) TECHNIQUES FOR PERFORMING CONTEXTUAL PHRASE GROUNDING

(71) Applicants: DISNEY ENTERPRISES, INC., Burbank, CA (US); ETH Zürich (Eidgenössische Technische Hochschule Zürich), Zürich (CH)

(72) Inventors: Pelin Dogan, Zürich (CH); Leonid Sigal, Vancouver (CA); Markus Gross, Zurich (CH)

(73) Assignees: DISNEY ENTERPRISES, INC., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 204 days.

(21) Appl. No.: 16/285,115

(22) Filed: Feb. 25, 2019

(65) Prior Publication Data
US 2020/0272695 A1 Aug. 27, 2020

(51) Int. Cl.
*G06F 40/30* (2020.01)
*G06F 40/253* (2020.01)
*G06N 3/08* (2023.01)

(52) U.S. Cl.
CPC .............. *G06F 40/30* (2020.01); *G06N 3/08* (2013.01); *G06F 40/253* (2020.01)

(58) Field of Classification Search
CPC .......... G06F 40/30; G06F 40/253; G06N 3/08
USPC ........................................................... 704/9
See application file for complete search history.

(56) References Cited

U.S. PATENT DOCUMENTS

| | | | | |
|---|---|---|---|---|
| 10,445,431 | B1* | 10/2019 | Lev-Tov | G06N 5/02 |
| 10,726,206 | B2* | 7/2020 | Sigal | G06N 3/08 |
| 2017/0061250 | A1* | 3/2017 | Gao | G06V 20/70 |
| 2017/0098153 | A1* | 4/2017 | Mao | G06N 3/045 |
| 2017/0139955 | A1* | 5/2017 | Dutta | G06F 16/51 |
| 2017/0147910 | A1* | 5/2017 | Mao | G06F 18/2413 |
| 2017/0150235 | A1* | 5/2017 | Mei | G06N 3/044 |
| 2017/0192961 | A1* | 7/2017 | Dutta | G06F 40/205 |

(Continued)

OTHER PUBLICATIONS

Hassan Akbari, Svebor Karaman, Surabhi Bhargava, Brian Chen, Carl Vondrick, Shih-Fu Changl, Multi-level Multimodal Common Semantic Space for Image-Phrase Grounding, Columbia University, New York, NY, USA, Nov. 28, 2018 (Year: 2018).*

(Continued)

*Primary Examiner* — Richemond Dorvil
*Assistant Examiner* — Rodrigo A Chavez
(74) *Attorney, Agent, or Firm* — Squire Patton Boggs LLP; Sarah Mirza

(57) ABSTRACT

In various embodiments, a phrase grounding model automatically performs phrase grounding for a source sentence and a source image. The phrase grounding model determines that a first phrase included in the source sentence matches a first region of the source image based on the first phrase and at least a second phrase included in the source sentence. The phrase grounding model then generates a matched pair that specifies the first phrase and the first region. Subsequently, one or more annotation operations are performed on the source image based on the matched pair. Advantageously, the accuracy of the phrase grounding model is increased relative to prior art solutions where the interrelationships between phrases are typically disregarded.

20 Claims, 4 Drawing Sheets

(56) References Cited

U.S. PATENT DOCUMENTS

| | | | |
|---|---|---|---|
| 2017/0325003 A1* | 11/2017 | Hackett | H04N 21/4884 |
| 2018/0143966 A1* | 5/2018 | Lu | G06F 18/2415 |
| 2018/0204111 A1* | 7/2018 | Zadeh | G06V 10/764 |
| 2018/0260698 A1* | 9/2018 | Lin | G06V 10/82 |
| 2018/0268548 A1* | 9/2018 | Lin | G06N 3/084 |
| 2018/0293440 A1* | 10/2018 | Kikin Gil | G06F 16/5866 |
| 2018/0329892 A1* | 11/2018 | Lubbers | G06N 3/08 |
| 2018/0373979 A1* | 12/2018 | Wang | G06F 18/24143 |
| 2019/0130206 A1* | 5/2019 | Trott | G06N 3/006 |
| 2019/0130221 A1* | 5/2019 | Bose | G06N 3/045 |
| 2019/0258713 A1* | 8/2019 | Kiros | G06F 40/20 |
| 2020/0042592 A1* | 2/2020 | Saito | G06F 40/211 |
| 2020/0097604 A1* | 3/2020 | Lee | G06N 3/08 |

OTHER PUBLICATIONS

Anto et al., "VQA: Visual question answering", In International Conference on Computer Vision 2015, pp. 2425-2433.

Chen et al., A Fast and Accurate Dependency Parser using Neural Networks, In Proceedings of the 2014 Conference on Empirical Methods in Natural Language Processing (EMNLP), Oct. 25-29, 2014, pp. 740-750.

Chen et al., "Query-guided Regression Network with Context Policy for Phrase Grounding", In International Conference on Computer Vision 2017, pp. 824-832.

Chen et al., "Attention to Scale: Scale-aware Semantic Image Segmentation", In IEEE Conference on Computer Vision and Pattern Recognition (CVPR) 2016, pp. 3640-3649.

Chen et al., "Spatial Memory for Context Reasoning in Object Detection" IEEE International Conference on Computer Vision 2017, pp. 4106-4116.

Chen et al., "Iterative visual reasoning beyond convolutions", IEEE/CVF Conference on Computer Vision and Pattern Recognition 2018, pp. 7239-7248.

Dogan et al., "A Neural Multi-Sequence Alignment TeCHnique (NeuMATCH)", The IEEE Conference on Computer Vision and Pattern Recognition (CVPR), 2018, pp. 8749-8758.

Farhadi et al., "Every picture tells a story: Generating sentences from images", ECCV'10: Proceedings of the 11th European conference on Computer vision: Part IV, Sep. 2010, pp. 15-29.

Felzenszwalb et al., Object Detection with Discriminatively Trained Part Based Models. IEEE Transactions on Pattern Analysis and Machine Intelligence vol. 32, Issue: 9 , Sep. 2010, pp. 1627-1645.

Fukui et al., Multimodal Compact Bilinear Pooling for Visual Question Answering and Visual Grounding. Proceedings of the 2016 Conference on Empirical Methods in Natural Language Processing, Nov. 2016, pp. 457-468.

Fukui et al., "Multimodal compact bilinear pooling for visual question answering and visual grounding" arXiv:1606.01847v3 [cs.CV], Sep. 24, 2016, 12 pages.

Gordo et al., "Deep Image Retrieval: Learning global representations for image search", ECCV 2016: 14th European Conference, Oct. 11-14, 2016, Proceedings, Part VI, pp. 241-257.

Hazen, Kirk, "An Introduction to Language", Wiley Blackwell, 453 pages. 2014.

He et al., Deep residual learning for image recognition. IEEE Conference on Computer Vision and Pattern Recognition (CVPR) 2016, pp. 770-778.

Hodosh et al.,"Framing Image Description as a Ranking Task: Data, Models and Evaluation Metrics", Journal of Artificial Intelligence Research, vol. 47, 2013, pp. 853-899.

Hu et al., "Natural Language Object Retrieval", The IEEE Conference on Computer Vision and Pattern Recognition (CVPR), 2016, pp. 4555-4564.

Johnson et al., "DenseCap: Fully Convolutional Localization Networks for Dense Captioning", IEEE Conference on Computer Vision and Pattern Recognition (CVPR), 2016, Jun. 27-30, 2016, pp. 4565-4574.

Karpathy et al., Deep visual-semantic alignments for generating image descriptions. IEEE Conference on Computer Vision and Pattern Recognition (CVPR), Jun. 7-12, 2015, 17 pages.

Karpathy et al., "Deep Visual-Semantic Alignments for Generating Image Descriptions", IEEE Conference on Computer Vision and Pattern Recognition (CVPR), Jun. 7-12, 2015 pp. 3128-3137.

Karpathy et al., "Deep Fragment Embeddings for Bidirectional Image Sentence Mapping", In Advances in neural Information processing systems, 2014, pp. 1889-1897.

Kazemzadeh et al., "ReferItGame: Referring to Objects in Photographs of Natural Scenes", Proceedings of the 2014 Conference on Empirical Methods in Natural Language Processing (EMNLP), Oct. 25-29, 2014, pp. 787-798.

Kiros et al., "Unifying Visual-Semantic Embeddings with Multimodal Neural Language Models", Transactions of the Association for Computational Linguistics, 2014, 13 pages.

Krishna et al., "Visual Genome: Connecting Language and Vision Using Crowdsourced Dense Image Annotations", International Journal of Computer Vision, May 2017, vol. 123, pp. 32-73.

Krizhevsky et al., "ImageNet Classification with Deep Convolutional Neural Networks" NIPS'12: Proceedings of the 25th International Conference on Neural Information Processing Systems, vol. 1, Dec. 2012, pp. 1097-1105.

Lin et al., "Visual Semantic Search: Retrieving Videos via Complex Textual Queries", IEEE Conference on Computer Vision and Pattern Recognition 2014, pp. 2657-2664.

Luo et al., "Comprehension-guided referring expressions", The IEEE Conference on Computer Vision and Pattern Recognition (CVPR), 2017, pp. 7102-7111.

Mao et al., "Generation and Comprehension of Unambiguous Object Descriptions", IEEE Conference on Computer Vision and Pattern Recognition (CVPR), Jun. 27-30, 2016, pp. 11-20.

Mao et al.,Deep Captioning with Multimodal Recurrent Neural Networks (M-RNN), arXiv: 1412.6632v5 [ cs.CV], Jun. 2015, 17 pages.

Pan et al., "Jointly Modeling Embedding and Translation to Bridge Video and Language", The IEEE Conference on Computer Vision and Pattern Recognition (CVPR), 2016, pp. 4594-4602.

Pennington et al., "Glove: Global Vectors for Word Representation", Proceedings of the 2014 Conference on Empirical Methods in Natural Language Processing (EMNLP), Oct. 25-29, 2014, pp. 1532-1543.

Plummer et al., "Conditional Image-Text Embedding Networks", In European Conference on Computer Vision, pp. 258-274.

Plummer et al., "Phrase Localization and Visual Relationship Detection with Comprehensive Image-Language Cues", In IEEE International Conference on Computer Vision 2017, pp. 1946-1955.

Plummer et al., "Flickr30k Entities: Collecting Region-to-Phrase Correspondences for Richer Image-to-Sentance Models", IEEE International Conference on Computer Vision, 2015, pp. 2641-2649.

Redmon et al., "You Only Look Once: Unified, Real-Time Object Detection", IEEE Conference on Computer Vision and Pattern Recognition (CVPR), Jun. 27-30, 2016, pp. 779-788.

Ren et al, "Faster R-CNN: Towards Real-Time Object Detection with Region Proposal Networks", In Advances in neural information processing systems, 2015, pp. 91-99.

Rohrbach et al., "Grounding of Textual Phrases in Images by Reconstruction", In European Conference on Computer Vision, Springer, 2016, pp. 817-834.

Sadeghi et al., "VisKE: Visual Knowledge Extraction and Question Answering by Visual Verification of Relation Phrases", IEEE Conference on Computer Vision and Pattern Recognition (CVPR) Jun. 7-12, 2015, pp. 1456-1464.

Simonyan et al., "Very Deep Convolutional Networks for Large-Scale Image Recognition", arXiv preprint arXiv:1409.1556, arXiv:1409.1556v6 [cs.CV] Apr. 10, 2015, 14 pages.

Sung et al., "Example-Based Learning for View-Based Human Face Detection", IEEE Transactions on Pattern Analysis And Machine Intelligence, vol. 20, No. 1, Jan. 1998, pp. 39-51.

Sutton et al., "Reinforcement Learning" An introduction, 2011, 548 pages.

(56) References Cited

OTHER PUBLICATIONS

Tommasi et al., "Solving Visual Madlibs with Multiple Cues", BMVC, 2016. pp. 77.1-77.13.

Torabi et al., "Learning Language-Visual Embedding for Movie Understanding with Natural-Language", arXiv preprint arXiv:1609.08124, Sep. 26, 2016, 13 pages.

Vendrov et al., "Order-Embeddings of Images and Language", arXiv preprintarXiv:1511.06361, Mar. 1, 2016, 12 pages.

Vinyals et al., Show and tell: A neural image caption generator. IEEE Conference on Computer Vision and Pattern Recognition (CVPR) 2015, pp. 3156-3164.

Wang et al., "Learning Two-Branch Neural Networks for Image-Text Matching Tasks" IEEE Transactions on Pattern Analysis and Machine Intelligence, 2018, 14 pages.

Wang et al., Learning Deep Structure-Preserving Image-Text Embeddings. IEEE Conference on Computer Vision and Pattern Recognition, 2016, pp. 5005-5013.

Wang et al., "Structured Matching for Phrase Localization", In European Conference on Computer Vision, Springer, 2016, pp. 696-711.

Xiao et al., "Weakly-supervised Visual Grounding of Phrases with Linguistic Structures", IEEE Conference on Computer Vision and Pattern Recognition 2017, pp. 5253-5262.

Xu et al., "Heterogeneous knowledge transfer in video emotion recognition, attribution and summarization", IEEE Transactions on Affective Computing, 2017, 16 pages.

Xu et al., "Ask, Attend and Answer: Exploring Question-Guided Spatial Attention for Visual Question Answering", In European Conference on Computer Vision 2016, pp. 451-466.

\* cited by examiner

TECHNIQUES FOR PERFORMING CONTEXTUAL PHRASE GROUNDING

BACKGROUND

Field of the Various Embodiments

Embodiments of the present invention relate generally to natural language and image processing and, more specifically, to techniques for performing contextual phrase grounding.

Description of the Related Art

Phrase grounding is the process of matching phrases included in a source sentence to corresponding regions in a source image described by the source sentence. For example, phrase grounding could match the phrases "a small kid," "blond hair," and "a cat" included in the source sentence "a small kid with blond hair is kissing a cat" to three different regions in an associated picture or source image. Some examples of high-level tasks that involve phrase grounding include image retrieval, image captioning, and visual question answering (i.e., generating natural language answers to natural language questions about an image). For many high-level tasks, manually performing phrase grounding is prohibitively time consuming. Consequently, phrase grounding techniques are oftentimes performed automatically.

In one approach to automatically performing phrase grounding, a noun-matching application breaks a source sentence into constituent noun phrases. The noun-matching application also performs object detection operations that generate bounding boxes corresponding to different objects in a source image. For each noun phrase, the noun-matching application then performs machine-learning operations that independently map each noun phrase to at most one of the bounding boxes.

One drawback of using noun-matching applications is that many conventional noun-matching applications disregard interrelationships between noun phrases. More specifically, when mapping a noun phrase to at most one of the bounding boxes, a typical noun-matching application does not consider the other noun phrases. Consequently, the mapping can be inconsistent with the other noun phrases and, therefore, inaccurate. For example, suppose that the source sentence was "a man with a hat is playing a guitar behind an open guitar case while sitting between two men." The noun-matching application would map the noun phrase "a man" to one of the bounding boxes independently of the noun phrases "a hat," "a guitar," "an open guitar case," and "two men." As a result, the noun-matching application could incorrectly map the noun phrase "a man" to a bounding box corresponding to one of the two men on either side of the man playing the guitar.

Another drawback of using noun-matching applications is that many conventional noun-matching applications map each noun phrase to at most one of the bounding boxes irrespective of whether the noun phrase actually matches multiple bounding boxes. As a result, a typical noun-matching application could fail to map a noun phrases to all matching regions of the source image. For example, the noun-matching application could match "two men" to the bounding box corresponding to one man, but not to the bounding box corresponding to another man in the image.

As the foregoing illustrates what is needed in the art are more effective ways to perform automated phrase grounding operations.

SUMMARY

One embodiment of the present invention sets forth a computer-implemented method for performing automated phrase grounding operations. The method includes determining that a first phrase included in a source sentence matches a first region of a source image based on the first phrase and at least a second phrase included in the source sentence; and generating a first matched pair that specifies the first phrase and the first region, wherein one or more annotation operations are subsequently performed on the source image based on the first matched pair.

At least one technical advantage of the disclosed techniques relative to the prior art is that the disclosed phrase grounding model sequentially generates grounding decisions for each phrase in a source sentence based on other phrases in the source sentence as well as previously generated grounding decisions. Consequently, the accuracy of the phrase grounding model is increased relative to prior art solutions where the interrelationships between phrases are typically disregarded. Another advantage of the disclosed techniques is that the disclosed phrase grounding model can generate multiple positive grounding decisions (i.e., matches to different regions of the source image) for each phrase. Consequently, the comprehensiveness of the phrase grounding model is is increased relative to prior art solutions where each noun phrase is matched to at most one region of the source image. These technical advantages provide one or more technological advancements over prior art solutions.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
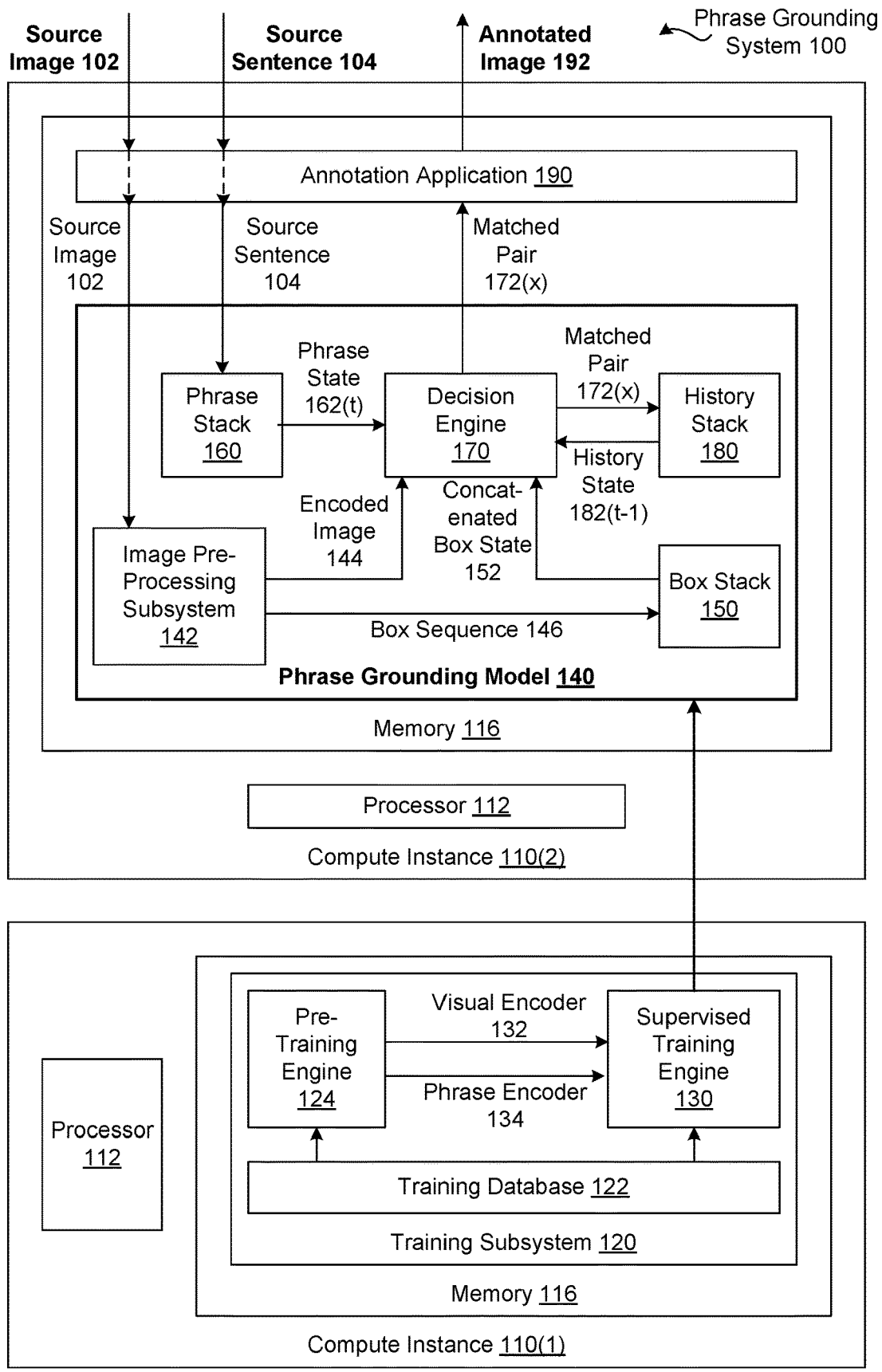
FIG. 1 is a conceptual illustration of a phrase grounding system configured to implement one or more aspects of the present invention.

FIG. 1 is a conceptual illustration of a phrase grounding system 100 configured to implement one or more aspects of the present invention. As shown, the phrase grounding system 100 includes, without limitation, any number of compute instances 110. For explanatory purposes, multiple instances of like objects are denoted with reference numbers identifying the object and parenthetical numbers identifying the instance where needed. In various embodiments, any number of the components of the phrase grounding system 100 may be distributed across multiple geographic locations or included in one or more cloud computing environments (i.e., encapsulated shared resources, software, data, etc.) in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. In alternate embodiments, each of the compute instances 110 may include any number of processors 112.

The memory 116 stores content, such as software applications and data, for use by the processor 112 of the compute instance 110. The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, each of the compute instances 110 is configured to implement one or more applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

In particular, the compute instances 110 are configured to automatically match phrases included in a source sentence 104 to corresponding regions in a source image 102 described by the source sentence 104 in a process referred to as "phrase grounding." The source sentence 104 may include any number of words and any number of phrases. Each of the phrases included in the source sentence 104 may describe any number (including zero) and type of objects included in the source image 102. In alternate embodiments, the source sentence 104 is a sequence of words that is not a complete sentence, such as a sentence fragment or a single noun. The source image 102 may be any type of image. For instance, the source image 102 could be a picture, a frame of a movie, an icon, etc.

In a typical approach to automatically performing phrase grounding, a noun-matching application performs machine learning operations that independently map each noun phrase to at most one box included in the source image. Each box is a bounding box that specifies a region of the source image that corresponds to one or more objects. One drawback of using noun-matching applications is that many conventional noun-matching applications disregards interrelationship between noun phrases. More specifically, when mapping each noun phrase, a typical noun-matching application does not consider the other noun phrases. Consequently, the mapping can be inconsistent with the other noun phrases and, therefore, inaccurate. Further, the accuracy of any high-level task that depends on the mapping could be reduced. For example, if a visual question answering application that generates natural language answers to natural language questions regarding the source image were to rely on inaccurate mappings, then the visual question answering application would likely generate incorrect answers. Another drawback of using noun-matching applications is that many conventional noun-matching applications map each noun phrase to at most one of the bounding boxes irrespective of whether the noun phrase actually matches multiple bounding boxes. As a result, a typical noun-matching application could fail to map a noun phrase to all matching regions of the source image.

Automatically Performing Contextual Phrase Grounding

To increase the accuracy of automatically performing phrase grounding, the phrase grounding system 100 includes, without limitation, a training subsystem 120 and a phrase grounding model 140. In general, the training subsystem 120 performs any number and type of machine learning operations to generate the phrase grounding model 140. The phrase grounding model 140 performs any number and type of operations that generate a grounding decision for each combination of phrase (not shown in FIG. 1) included in the source sentence 104 and each box (not shown in FIG. 1) included in the source image 102.

Each grounding decision specifies whether there is a match between the associated phrase and the associated box. A positive grounding decision indicates that there is a match between the associated phrase and the associated box. By contrast, a negative grounding decision indicates that there is not a match between the associated phrase and the associated box. For each positive grounding decision, the phrase grounding model 140 generates a matched pair 172 that specifies the associated phrase and the associated box. Advantageously, the phrase grounding model 140 generates the grounding decisions for each phrase sequentially based on previously generated matched pairs 172, the remaining phrases, the boxes, and the source image 102.

The training subsystem 120 resides in the memory 116 and executes on the processor 112 of the compute instance 110(1). As shown, the training subsystem 120 includes, without limitation, a training database 122, a pre-training engine 124 and a supervised training engine 130. The training database 122 includes, without limitation, any number of training datasets, where each training dataset may be used by the pre-training engine 124 and/or the supervised training engine 130. Each training dataset includes, without limitation, any amount and type of ground-truth data arranged in any technically feasible fashion.

For instance, in some embodiments, one or more of the training datasets include, without limitation, any number and combination of training images, training sentences, and ground-truth decisions. Each negative ground-truth decision indicates that there is no match between an associated phrase and an associated box. Each positive ground-truth decision indicates that there is a match between an associated phrase and an associated box. The training subsystem 120 generates the ground-truth decisions based on a dataset that includes ground-truth matches, a region proposal network (not shown in FIG. 1), a positive threshold, and a negative threshold. Each ground-truth match specifies a region included in a training image and a matching phrase included in a training sentence.

More precisely, for each combination of box and ground-truth match, the training subsystem 120 computes an intersection-over-union (IoU) overlap between the box and the region specified in the ground-truth match. If an IoU overlap is greater than the positive threshold (e.g., 0.7), then the training subsystem 120 generates a positive ground-truth decision specifying the box and the phrase included in the ground-truth match. If the IoU overlap is less than the negative threshold (e.g., 0.3), then the training subsystem 120 generates a negative ground-truth decision specifying the box and the phrase included in the ground-truth match. In alternate embodiments, the datasets and the ground-truth decisions may be generated in any technically feasible fashion.

As shown, the pre-training engine 124 generates a visual encoder 132 and a phrase encoder 134 based on the training database 122. More precisely, the pre-training engine 124 pre-trains an untrained visual encoder 132 and an untrained phrase encoder 134 to jointly embed training sentences and training images into the same latent space. The pre-training engine 124 may perform any number and type of machine learning operations to pre-train the visual encoder 132 and the phrase encoder 134.

For instance, in some embodiments, the pre-training engine 124 computes an asymmetric similarity for each positive ground-truth decision. The pre-training engine 124 computes the asymmetrical similarity (F) for a positive ground-truth decision associated with a phrase ($P_k$) and a box ($B_k$) based on the following equation (1):

$$F(p_k, b_k) = -\|\max(0, b_k - p_k)\|^2 \quad (1)$$

In equation (1), $b_k$ is an image feature list for $B_k$ in the latent space obtained by the visual encoder 132 and $p_k$ is a phrase feature list for $P_k$ in the latent space obtained by the phrase encoder 134.

The pre-training engine 124 also implements a ranking loss objective by randomly sampling a contrastive box B' and a contrastive phrase P' for every positive ground-truth decision. Minimizing the loss function (L) specified in equation 2 ensures that the similarity of the contrastive pair is below the "true" pair associated with the positive ground-truth decision by at least a margin α:

$$L = \sum_i \left( E_{b' \neq b_k} \max\{0, \alpha - F(b_k, p_k) + F(b', p_k)\} + \right. \quad (2)$$
$$\left. E_{p' \neq p_k} \max\{0, \alpha - F(b_k, p_k) + F(b_k, p')\} \right)$$

In equation 2, the expectations (E) are generated by sampling.

As shown, the supervised training engine 130 generates the phrase grounding model 140 based on the pre-trained visual encoder 132, the pre-trained phrase encoder 134, and the training database 122. In particular, the supervised training engine 130 performs any number and type of machine learning operations to train an untrained phrase grounding model 140 to accurately generate the ground-truth grounding decisions based on the training sentences and the training images. For instance, in some embodiments, the supervised training engine 130 performs machine learning operations based on a training objective to minimize the overall binary cross-entropy loss caused by the grounding decisions at each time step during the phrase grounding process.

Figure 2:
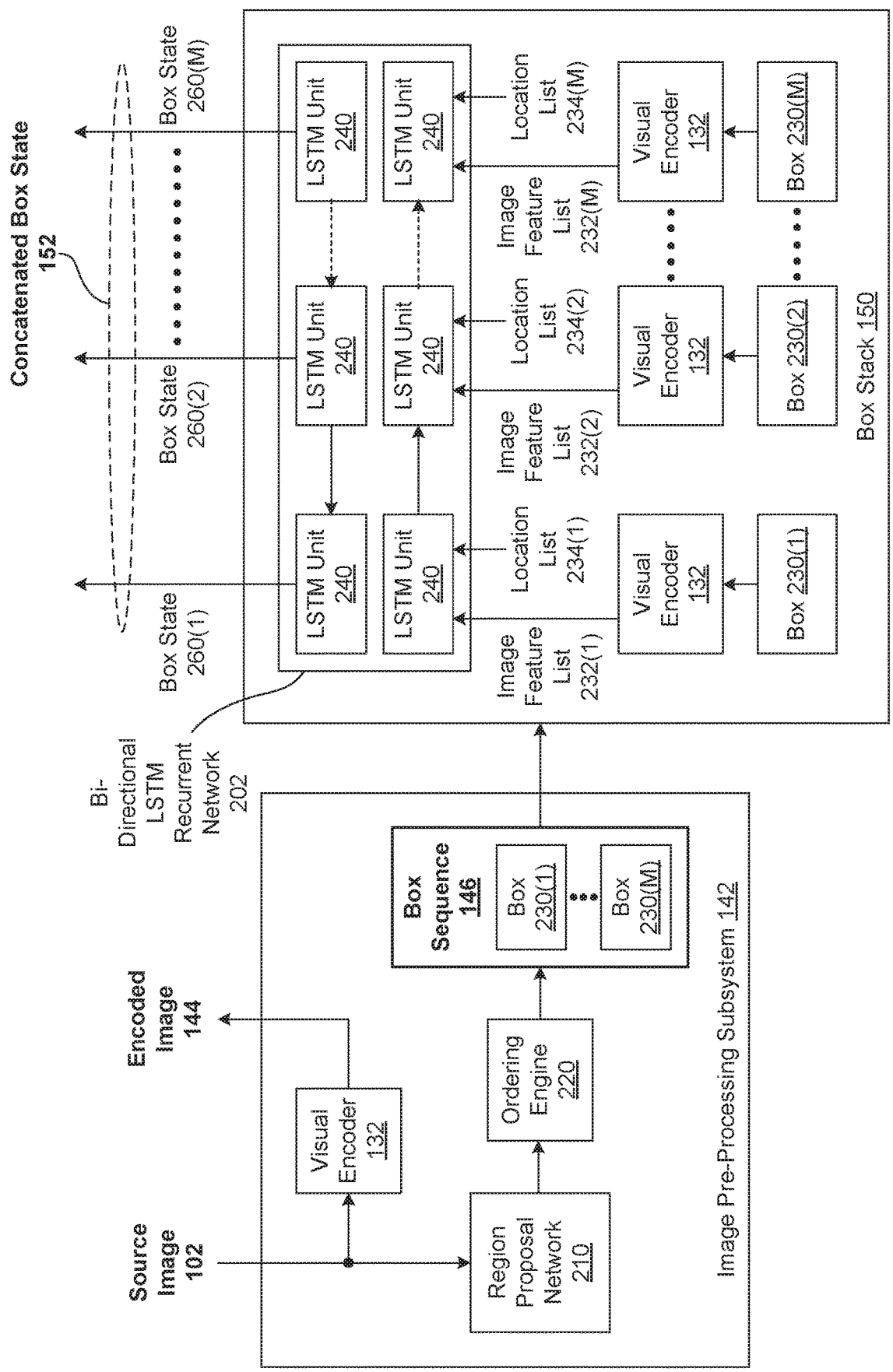
FIG. 2 is a more detailed illustration of the image pre-processing subsystem and the box stack of FIG. 1, according to various embodiments of the present invention.
Figure 3:
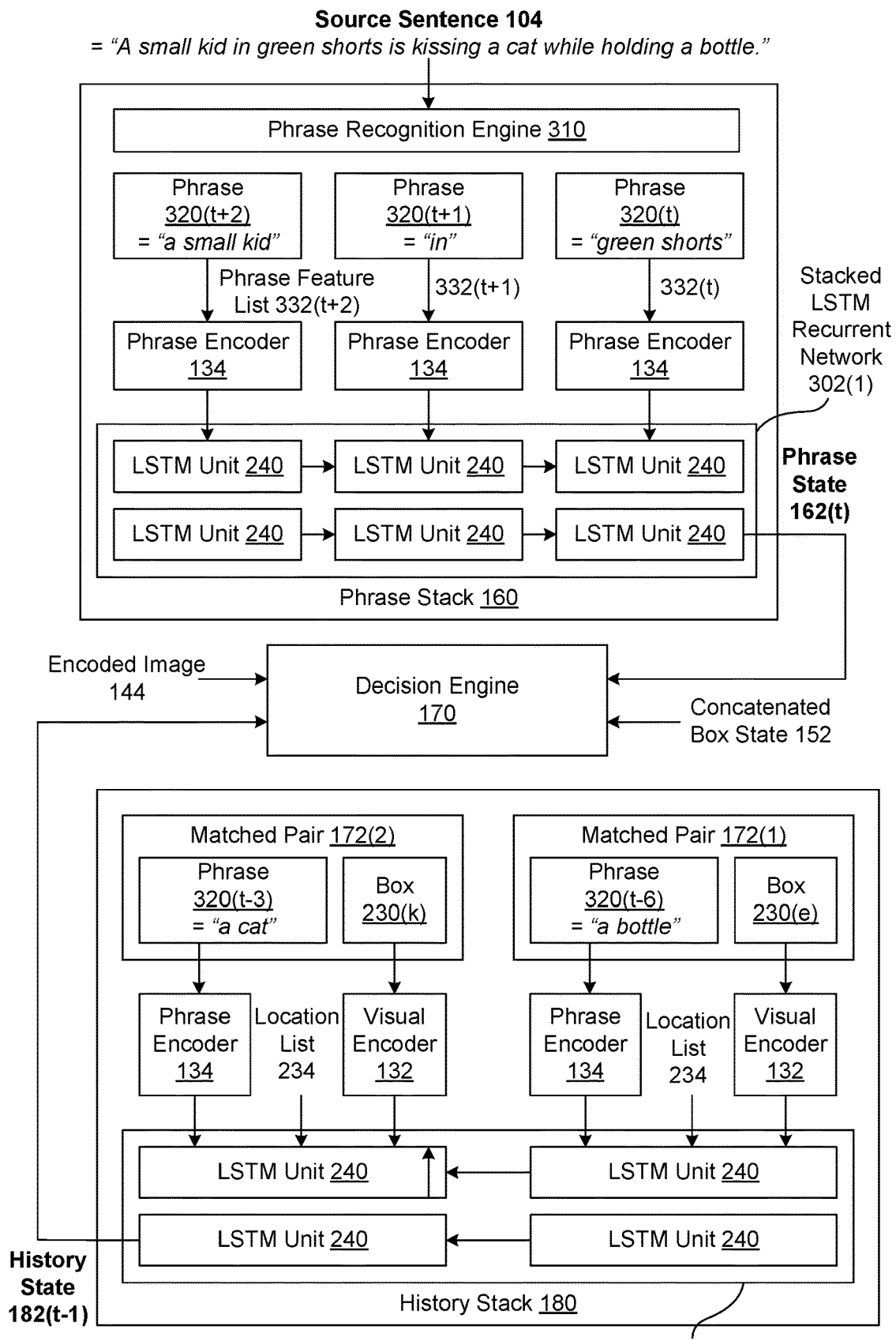
FIG. 3 is a more detailed illustration of the phrase stack and the history stack of FIG. 1, according to various embodiments of the present invention.

As described in greater detail in conjunction with FIGS. 2 and 3, the phrase grounding model 142 includes, without limitation, instances of the visual encoder 132 and the phrase encoder 134. As part of generating the phrase grounding model 140, the supervised training engine 130 generates the trained visual encoder 132 and the trained phrase encoder 134 based on the pre-trained visual encoder 132 and the pre-trained phrase encoder 134. The visual encoder 132 and the phrase encoder 134 may be implemented in any technically feasible fashion. For instance, in some embodiments, the visual encoder 132 includes, without limitation, a convolutional neural network (CNN) followed by three fully-connected layers, and the phrase encoder 135 includes, without limitation, three fully-connected layers.

Different instances of the trained visual encoder 132 share one set of values for the machine learning parameters, such as weights and biases. Similarly, different instances of the trained phrase encoder 134 share one set of values for the machine learning parameters. The trained phrase grounding model 140 resides in the memory 116 and executes on the processor 112 of the compute instance 110(2). As shown, the phrase grounding model 140 includes, without limitation, an image pre-processing subsystem 142, a box stack 150, a phrase stack 160, a history stack 180, and a decision engine 170.

The image pre-processing subsystem 142 generates an encoded image 144 and a box sequence 146 based on the source image 102. The box sequence 146 includes, without limitation, any number of spatially ordered boxes, where each box represents a different region of the source image 102. The image pre-processing subsystem 142 may order the boxes in any technically feasible fashion to generate the box sequence 146.

The box stack 150 implements a bi-directional recurrent neural network (RNN) containing the boxes included in the box sequence 146. As persons skilled in the art will recognize, an RNN is a computational method for modeling interrelationships between sequential data points using deep learning primitives. The box stack 150 has a concatenated box state 152 that includes, without limitation, a different box state for each box. The concatenated box state 152 does not change over time. Further, each box state included in the concatenated box state 152 encodes interrelationship and dependencies between all the boxes included in the box sequence 146. The image pre-processing subsystem 142 and the box stack 150 are described in greater detail in conjunction with FIG. 2.

The phrase stack 160 implements a stacked RNN that contains any number of phrases extracted from the source sentence 104. At any given time, the stacked RNN contains the phrases in the source sentence 104 for which the decision engine 170 has not yet finished performing phrase grounding. In a complementary fashion, the history stack 180 implements a stacked RNN that contains the matched pairs 172 associated with the phrases for which the decision engine 170 has finished performing phrase grounding. Each matched pair 172 is associated with a different positive grounding decision and includes, without limitation, a phrase and a matching box.

The phrase stack 160 has a phrase state 162 that changes over time and the history stack 180 has a history state 182 that changes over time. For explanatory purposes only, at a given time step t, the phrase stack 160 is associated with the phrase state 162(t) and the history stack 180 is associated with the history state 182(t−1). Importantly, the phrase state 162(t) encodes contextual information for all the phrases for which the decision engine 170 has finished performing phrase grounding. And the history state 182(t−1) encodes information for all the matched pairs 172 previously generated by the decision engine 170. The phrase stack 160 and the history stack 180 are described in greater detail in conjunction with FIG. 3

At each time step, the decision engine 170 performs phrase grounding operations for the "top" phrase that is at the top of the phrase stack 160. Importantly, the decision engine 170 performs the phrase grounding operations based on the encoded image 144, the concatenated box state 152, the phrase state 162(t), and the history state 182(t−1). For the top phrase, the decision engine 170 performs phrase grounding operations substantially in parallel for each box included in the box sequence 162

More precisely, the decision engine 170 includes, without limitation, a different instance of a decision neural network (not shown) for each box included in the box sequence 162. The instance of the decision neural network associated with a given box performs phrase grounding operations based on the encoded image 144, the associated box state included in the concatenated box state 152, the phrase state 162(t), and the history state 182(t). The different instances of the decision neural network share the same values for the machine learning parameters, such as weights and biases. Further, because the box state for each box includes contextual information, each grounding decision depends on all of the boxes included in the box sequence 146.

The decision neural network may be implemented in any technically feasible fashion. For instance, in some embodiments, the decision neural network implements the following equation 3 that specifies the conditional probability (Pr) of the grounding decision $d_{ti}$ associated with the box $B_i$ and the phrase $P_t$:

$$Pr(d_{ti}|\Psi_t) = Pr(d_{ti}|P_t, B_i, H_{t-1}, I_{enc}) \qquad (3)$$

In equation 3, $\psi_t$ is an overall state at time t for the phrase stack 170, the box stack 150, and the history stack 180. $P_t$ is the phrase state 162(t), $B_i$ is the box state for the box B, $H_{t-1}$ is the history state 182(t−1), and $I_{enc}$ is the encoded image 144.

The decision neural network may implement equation 3 in any technically feasible fashion. For instance, in some embodiments, the decision neural network implements a sigmoid operation after three fully connected layers on top of a concatenated overall state [$P_t$, N, $H_{t-1}$, $I_{enc}$]. Further, the decision neural network implements a rectified linear unit (ReLU) between the layers.

The decision engine 170 may perform phrase grounding on the entire phrase sequence with the box sequence 146 in any technically feasible fashion. For instance, in some embodiments, the decision engine 170 applies the chain rule as per equations (4) and (5):

$$Pr(D_1, \ldots D_N | P, B) = \prod_{t=1}^{N} Pr(D_t | D_{(t-1)-}, \Psi_t) \qquad (4)$$

$$Pr(D_t | P, B) = \prod_{i=1}^{M} Pr(d_{ti} | D_{(t-1)-}, \Psi_t) \qquad (5)$$

In equations 4 and 5, $D_t$ represents the set of all the grounding decisions over all the boxes for the phrase $P_t$. As persons skilled in the art will recognize, always selecting the most profitable grounding decision optimizes the conditional probability in a greedy fashion.

In alternate embodiments, the decision engine 170 may implement any number and type of operations based on any number and type of equations to generate grounding decisions for the top phrase based on at least the phrase state 162(t), the history state 182(t−1), and the box sequence 146. In various embodiments, the number of instances of the decision neural networks is not equal to the number of boxes. In such embodiments, for each phrase, the decision engine 170 may generate grounding decisions at least partially sequentially.

Each grounding decision is a value that ranges from 0 to 1. If a grounding decision exceeds a positive decision threshold, then the decision engine 170 generates the matched pair 172 that specifies the top phrase and the box that is associated with the grounding decision. Otherwise, the decision engine 170 discards the grounding decision. The decision engine 170 may acquire the positive decision threshold in any technically feasible fashion. For example, the decision engine 170 could implement a hard-coded positive decision threshold or receive the positive decision threshold from a graphical user interface (GUI).

After the decision engine 170 finishes generating the grounding decisions for the top phrase, the decision engine 170 adds each newly generated matched pair 172 to the history stack 180. In general, the decision engine 170 adds each matched pair 172 to the top of the history stack 180 based on the ordering established by the box sequence 146. As a result, the history stack 180 transitions from the history state 182(t) to a new history state 182(t+1). The decision engine 170 also removes the top phrase from the phrase stack 160. Removing the top phrase from the phrase stack is also referred to herein as "popping" the phrase stack 160. As a result, the phrase stack 160 has a new top phrase and transitions from the phrase state 162(t) to a new phrase state 162(t+1).

As shown, the decision engine 170 also transmits each newly generated matched pair 172 to an annotation application 190. After the decision engine 170 has performed phrase grounding for all the phrases included in the source sentence 104, the annotation application 190 generates an annotated image 192 based on the source image 102 and the matched pairs 172. In alternate embodiments, the annotation application 190 may be omitted from the phrase grounding system 100 or replaced with any number and type of applications that perform any number of operations based on the matched pairs 172.

Advantageously, by sequentially generating grounding decisions for each combination of phrase and box in the context of other phrases, other boxes, and previously generated grounding decisions, the accuracy of the phrase grounding process is increased. Further, unlike prior art techniques, the decision engine 170 can generate multiple matched pairs 172 for each phrase and multiple matched pairs 172 for each box.

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques outlined herein are applicable to performing phrase grounding based on a phrase stack that models relationships between phrases for which grounding decisions have not yet been generated and a history stack that models relationships between previous grounding decisions.

For instance, in some embodiments, the phrase grounding system 100 omits the pre-training engine 124. In the same or other embodiments, the phrase grounding system 100 omits the box stack 150, and the decision engine 170 generates the grounding decisions based on the phrase state 162, the history state 182, and the box sequence 146.

Preserving Contextual Information Via Recurrent Neural Networks (RNNs)

FIG. 2 is a more detailed illustration of the image pre-processing subsystem 142 and the box stack 160 of FIG. 1, according to various embodiments of the present invention. The image pre-processing subsystem 142 and the box stack 160 operate during an initialization phase that completes before the decision engine 170 begins to execute. As shown, the image pre-processing subsystem 142 includes, without limitation, an instance of the visual encoder 132, a region proposal network (RPN) 210, an ordering engine 220, and the box sequence 146.

The visual encoder 132 receives the source image 102, generates the encoded image 144, and transmits the encoded image 144 to the decision engine 170. The region proposal network 210 receives the source image 102 and generates any number of boxes 230. Each of the boxes 230 is a different bounding box that specifies a region of the source image 102 in any technically feasible fashion. The region proposal network 210 may implement any number and type of object detection operations to generate the boxes 230.

The ordering engine 220 generates the box sequence 146 that includes, without limitation, the boxes 230 generated by the region proposal network 210. To generate the box sequence 146, the ordering engine 220 orders the boxes 230 from left to right with respect to the centers of the boxes 230 along a horizontal axis for a "forward" direction. The forward direction is associated with a bi-directional long short-term memory (LSTM) network 202 implemented in the box stack 150. In alternate embodiments, the ordering engine 220 may implement any number and type of ordering operations that produce any type of spatially-ordered box sequence 146. In other embodiments, the pre-processing subsystem 142 omits the ordering engine 220 and the order of the boxes 230 included in the box sequence 146 is random. The ordering engine 220 transmits the box sequence 146 to the box stack 150. For explanatory purposes only, the box sequence 146 includes, without limitation, M boxes 230(1)-230(M).

As shown, the box stack 150 includes, without limitation, the bi-directional LSTM recurrent network 202 and M instances of the visual encoder 132. The bi-directional LSTM recurrent network 202 includes, without limitation 2*M LSTM units 240. In alternate embodiments, the box stack 150 may include any number of instances of the visual encoders 132, and the bi-directional LSTM recurrent network 202 may include any number of LTSM units 240. In various embodiments, the bi-directional LSTM recurrent network 202 may be replaced with any other type or RN N or neural network.

For each of the boxes 230($x$), the visual encoder 132 performs encoding operations to generate an image feature list 232($x$). The image feature list 232($x$) is a concatenation of features of the box 230($x$) in the latent space shared with the phrase encoder 134. The bi-directional LSTM recurrent network 202 has M inputs, where the $x^{th}$ input is a concatenation of the image feature list 232($x$) and a location list 234($x$). The location list 234($x$) specifies the normalized locations of the features included in the image feature list 232($x$) with respect to the source image 102. The LSTM unit 240($x$) has the box state 260($x$) and the box state 260($x$) does not change over time. The box state 260($x$) is also commonly referred to as a hidden state of the LSTM unit 240($x$) included in the bi-directional LSTM recurrent network 202. The concatenation of the box states 260(1)-260(M) in the order established by the box sequence 146 is the concatenated box state 152. After the initialization phase, the concatenated box state 152 does not change over time.

FIG. 3 is a more detailed illustration of the phrase stack 160 and the history stack 180 of FIG. 1, according to various embodiments of the present invention. For explanatory purposes only, FIG. 3 depicts the phrase stack 160 and the history stack 180 at a particular timestamp t. As shown, the phrase stack 160 includes, without limitation, a phrase recognition engine 310, any number of phrase encoders 134, and a stacked LSTM recurrent network 302(1).

The phrase recognition engine 310 operates during an initialization phase that completes before the decision engine 170 begins to execute. In operation, the phrase recognition engine 310 extracts any number of phrases 320 from the source sentence 104 in any technically feasible fashion. Subsequently, the phrase recognition engine 310 initializes the stacked LSTM recurrent network 302(1) to contain all of the phrases 320 included in the source sentence 104. As part of initializing the stacked LSTM recurrent network 302(1), the phrase recognition engine 310 configures the phrase encoders 134 to generate a phrase feature list 332($x$) for each of the different phrases 320($x$). The phrase feature list 332($x$) is a concatenation of the features of the phrase 320($x$) in the latent space shared with the visual encoder 132.

The phrase recognition engine 310 orders the phrase feature lists 332($x$) in a grounding order. For the phrase stack 160 depicted in FIG. 3, the grounding order is the reverse order in which the phrases 320 occur in the source sentence 104 (i.e., from right to left). The phrase recognition engine 170 then inputs each of the phrase features lists 332($x$) to the stacked LSTM recurrent network 302(1) as per the grounding order.

First, the phrase recognition engine 170 adds the phrase feature list 332($x$) of the last phrase included in the source sentence 104 to the bottom of the stacked LSTM recurrent network 302(1), then the phrase recognition engine 310 adds the phrase feature list 332($x$) of the second to last phrase included in the source sentence 104 to the bottom of the stacked LSTM recurrent network 302(1), and so forth. As a result, the initial top phrase 320 contained in the phrase stack 160 is the last phrase 320 included in the source sentence 104. In alternate embodiments, the phrase recognition engine 310 may implement any type of grounding order. For instance, in some embodiments, the phrase recognition engine 310 implements a forward grounding order from left to right. In other embodiments, the phrase recognition engine 310 implements a random grounding order The stacked LSTM recurrent network 302(1) includes, without limitation, any number of LSTM units 240 organized into two stacks, where a hidden state of the first layer is fed into the second layer. The stacked LSTM recurrent network 302(1) performs encoding based on the following equations 6(a) and 6(b):

$$h_t^{(1)}, c_t^{(1)} = \text{LSTM}(x_t, h_{t-1}^{(1)}, c_{t-1}^{(1)}) \tag{6a}$$

$$h_t^{(2)}, c_t^{(2)} = \text{LSTM}(h_t^{(1)}, h_{t-1}^{(2)}, c_{t-1}^{(2)}) \tag{6b}$$

In equations 6a and 6b, the superscript (1) indicates the first layer, the superscript (2) indicates the second layer, $h_t$ is a hidden state at timestamp t, $c_t$ is one of the LSTM units 240(t), and $x_t$ is the $i^{th}$ input In alternate embodiments, the stacked LSTM recurrent network 302(1) may include any number of stacks. Further, the stacked LSTM recurrent network 320(1) may perform any number and type of encoding operations based on any equations instead of equations 6a and 6b. In other embodiments, the stacked LSTM recurrent network 302(1) may be replaced with any other type of RNN or neural network.

As described in conjunction with FIG. 1, at any given timestamp t, the decision engine 170 generates grounding decisions for the top phrase 320(t) contained in the phrase stack 160 based on the phrase state 142(t), the history state 182(t−1), the concatenated box state 152, and the encoded image 144. For explanatory purposes only, the index associated with a given phrase 320 indicates the timestamp during which the decision engine 170 processes the phrase 320. For example, the top phrase 320 has the index of t. For each positive grounding decision, the decision engine 170 generates a corresponding matched pair 172. As shown, each of the matched pairs 172 includes, without limitation, one of the phrases 320 and one of the boxes 230.

After the decision engine 170 finishes generating the grounding decisions for the top phrase 320(t), the decision engine 170 adds each newly generated matched pair 172 to the history stack 180. As shown, the history stack 180 includes, without limitation, any number of instances of the phrase encoder 134, any number of instances of the visual encoder 132, and the stacked LSTM recurrent network 302(2). The stacked LSTM recurrent network 302(2) includes, without limitation, any number of LSTM units 240 organized into two stacks, where a hidden state of the first layer is fed into the second layer. The stacked LSTM recurrent network 302(1) performs encoding based on the equations 6(a) and 6(b). Notably, the set of machine learning parameters associated with the stacked LSTM recurrent network 302(2) differ from the set of machine learning parameters associated with the stacked LSTM recurrent network 302(1).

In alternate embodiments, the stacked LSTM recurrent network 302(2) may include any number of stacks. Further, the stacked LSTM recurrent network 320(2) may perform any number and type of encoding based on any equations instead of equations 6a and 6b. In other embodiments, the stacked LSTM recurrent network 302(2) may be replaced with any other type or RNN or neural network.

For the top phrase 320(t), the decision engine 170 adds each newly matched pair 172 to the top of the history stack 180 based on the ordering established by the box sequence 146. To add the matched pair 172 to the top of the history stack 180, the history stack 180 configures the phrase encoder 134 to generate the phrase feature list 332 for the phrase 320 included in the matched pair 172. In a complementary fashion, the history stack 180 configures the visual encoder 132 to generate the image feature list 232 for the box 230 included in the matched pair 172. The history stack 180 then concatenates the phrase feature list 332, the image feature list 232, and the location list 234 for the box 230 included in the matched pair 172 to generate the input to the stacked LSTM recurrent network 302(2). In this fashion, the history stack 180 transitions from the history state 182(t−1) to a new history state 182(t).

After adding the newly matched pairs 172 for the top phrase 320(t) to the history stack 180, the decision engine 170 removes the top phrase 320(t) from the phrase stack 160. Removing the top phrase 320(t) from the phrase stack 160 is also referred to herein a popping the phrase stack 160. As a result, the phrase stack 160 has a new top phrase 320(t+1) and transitions from the phrase state 162(t) to a new phrase state 162(t+1).

For explanatory purposes only, FIG. 3 depicts exemplary values in italics for the source sentence 104, the phrases 320 contained in the phrase stack 160 at the timestamp t, and the matched pairs 172 contained in the history stack 180 at the timestamp t. As shown, the source sentence 104 is "A small kid in green shorts is kissing a cat while holding a bottle." Although not shown, during the initialization phase, the phrase recognition engine 310 generates the phrases 320 "a small kid," "in," "green shorts," "is," "kissing," "a cat," "while," "holding," "a bottle."

At the timestamp t, the decision engine 170 has sequentially processed the phrases 320(t−6) "a bottle," 320(t−5) "holding," 320(t−4) "while," the phrase 320(t−3) "a cat," the phrase 320(t−2) "kissing," and the phrase 320(t−1) "is." The decision engine 170 has generated the matched pair 172(1) that maps the phrase 320(t−6) "a bottle" to the box 230(e) and the matched pair 172(2) that maps the phrase 320(t−3) "a cat" to the box 230(k). Accordingly, the history stack 180 contains the two matched pairs 172(1) and 172(2). By contrast, the phrase stack 160 contains the phrases 320(t) "green shorts," 320(t+1) "in," and 320(t+2) "a small kid" that the decision engine 170 has not yet processed. The top phrase 320 is the phrase 320(t) "green shorts."

Figure 4:
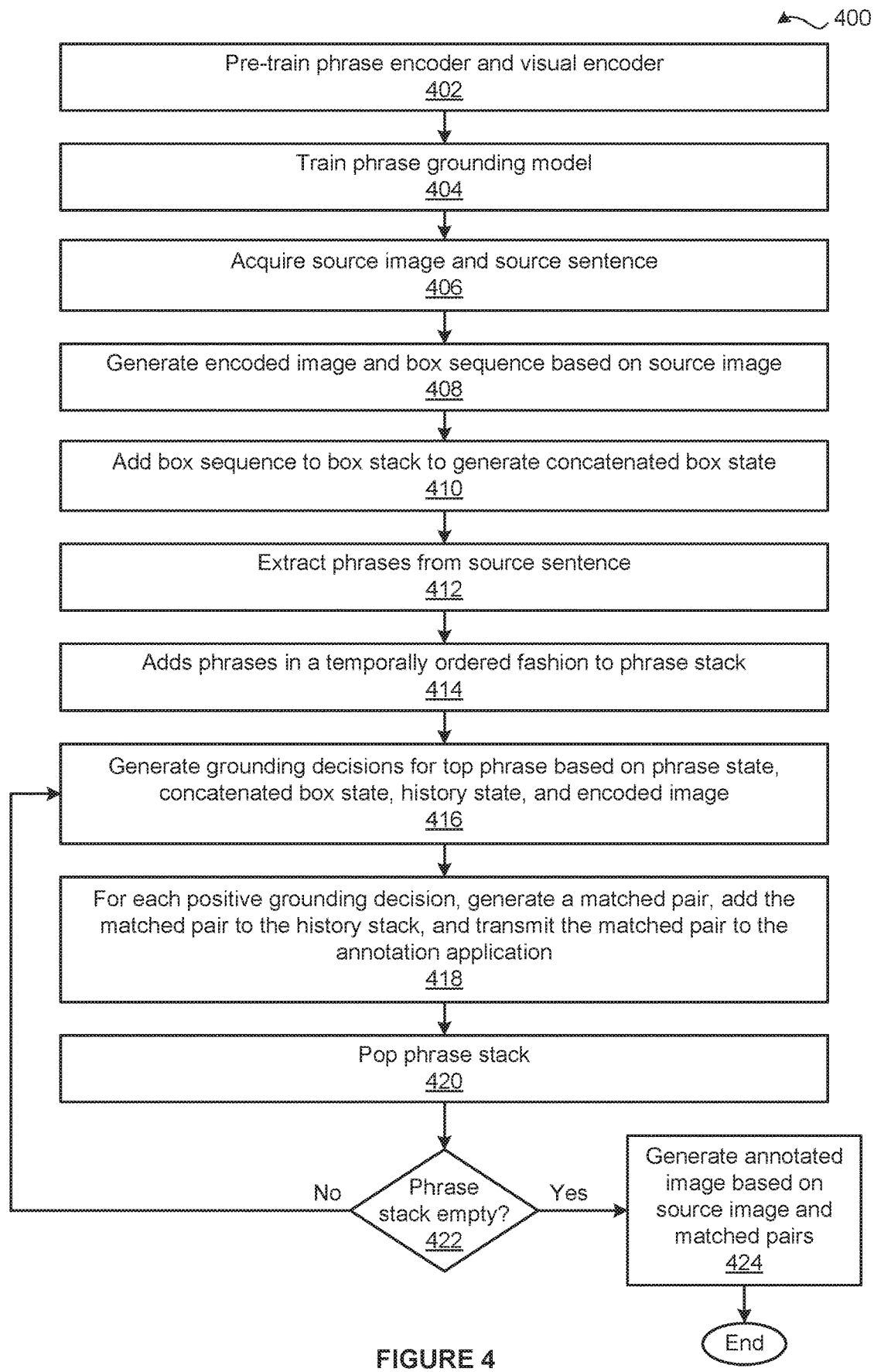
FIG. 4 is a flow diagram of method steps for performing automated phrase grounding operations, according to various embodiments of the present invention.

FIG. 4 is a flow diagram of method steps for performing automated phrase grounding operations, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the pre-training engine 124 pre-trains the phrase encoder 132 and the visual encoder 134. At step 404, the supervised training engine 130 trains the phrase grounding model 140. At step 406, the phrase grounding model 140 acquires the source image 102 and the source sentence 104. At step 408, the image pre-processing subsystem 142 generates the encoded image 144 and the box sequence 146 based on the source image 102. At step 410, the phrase grounding model 140 adds each box 230 included in the box sequence 146 to the box stack 150 to generate the concatenated box state 152. At step 412, the phrase recognition engine 310 extracts the phrases 320 from the source sentence 104. At step 414, the phrase recognition engine 310 adds the phrases 320 in a temporally ordered fashion to the phrase stack 160.

At step 416, the decision engine 170 generates grounding decisions for the top phrase 320 contained in the phrase stack 160 based on the phrase state 162(t), the concatenated box state 152, the history state 182(t), and the encoded image 144. More precisely, the decision engine 170 generates a different grounding decision for each box 230 included in the box sequence 146. At step 418, for each positive grounding decision, the decision engine 170 generates the associated matched pair 172, adds the matched pair 172 to the history stack 180, and transmits the matched pair 172 to the annotation application 190. At step 420, the decision engine 170 pops the phrase stack 160.

At step 422, the decision engine 170 determines whether the phrase stack 160 is empty. If, at step 422, the decision engine 170 determines that the phrase stack 160 is empty, then the method 400 returns to step 416, where the decision engine 170 generates new grounding for the new top phrase 320 contained in the phrase stack 160. If, however, at step 422, the decision engine 170 determines that the phrase stack 160 is not empty, then the method 400 proceeds to step 424. At step 424, the annotation application 190 generates the annotated image 192 based on the source image 104 and the matched pairs 172. The method 400 then terminates.

In sum, the disclosed techniques may be used to automatically perform phrase grounding. First, a pre-training engine trains a visual encoder and a phrase encoder to jointly embed encoded images and encoded sentences into a shared latent space. Subsequently, a training engine trains a phrase grounding model to perform phrase grounding in the shared latent space on a source image and a source sentence. The phrase grounding model includes, without limitation, an image pre-processing subsystem, a box stack, a phrase stack, a history stack, and a decision engine. The image pre-processing subsystem generates an encoded image and a box sequence based on the source image. The box sequence includes any number of spatially ordered boxes, where each box represents a different region of the source image that contains an object. The box stack includes, without limitation, a bi-directional recurrent neural network (RNN) containing the box sequence. A concatenated box state includes a different box state for each box and does not change over time.

The phrase stack implements a stacked RNN that contains any number of phrases included in the source sentence. More precisely, the stacked RNN contains the phrases in the source sentence for which the decision engine has not yet performed phrase grounding. In a complementary fashion, the history stack implements a stacked RNN that contains matched pairs of phrases and boxes. Notably, the states of both the phrase stack and the history stack change over time. Initially, the phrase stack contains all the phrases in the source sentence and the history stack is empty.

The decision engine iteratively processes each phrase included in the source sentence. At each iteration, the decision engine generates grounding decisions for the top phrase included in the phrase stack based on the state of the phrase stack, the concatenated box state, the state of the history stack, and the encoded image. For each positive grounding decision, the decision engine generates a new matched pair that specifies the top phrase and the associated box. The decision engine adds each new matched pair to the history stack and transmits each new matched pair to an annotation engine. The decision engine subsequently pops the top phrase from the phrase stack. After the decision engine has finished processing the phrases included in the source sentence, the annotation engine annotates the source image based on the matched pairs.

At least one technical advantage of the disclosed techniques relative to prior art solutions is that the disclosed phrase grounding model automatically performs contextual phrase grounding. More precisely, unlike prior art approaches to phrase grounding, the phrase grounding model sequentially generates grounding decisions for each phrase in a source sentence based on other phrases in the source sentence as well as previously generated matched pairs. Taking into consideration other phrases and previously generated matched pairs increases the accuracy of the phrase grounding model relative to prior art solutions where the interrelationships between noun phrases are typically disregarded. Another advantage of the disclosed techniques is that the disclosed phrase grounding model may generate multiple positive grounding decisions (e.g., matches to different regions of the source image) for each phrase. Consequently, the comprehensiveness of the phrase grounding model is is increased relative to prior art solutions where each noun phrase is matched to at most one region of the source image. These technical advantages provide one or more technological advancements over the prior art solutions.

1. In some embodiments, a computer-implemented method for performing automated phrase grounding operations comprises determining that a first phrase included in a source sentence matches a first region of a source image based on the first phrase and at least a second phrase included in the source sentence; and generating a first matched pair that specifies the first phrase and the first region, wherein one or more annotation operations are subsequently performed on the source image based on the first matched pair.

2. The computer implemented of clause 1, further comprising determining that the first phrase matches a second region of the source image based on the first phrase and the at least the second phrase; and generating a second matched pair that specifies the first phrase and the second region, wherein one or more annotation operations are subsequently performed on the source image based on the second matched pair.

3. The computer implemented of clause 1 or 2, further comprising determining that the second phrase matches the first region based on the second phrase and the first matched pair; and generating a second matched pair that specifies the second phrase and the first region, wherein one or more annotation operations are subsequently performed on the source image based on the second matched pair.

4. The computer-implemented method of any of clauses 1-3, wherein determining that the first phrase matches the first region comprises generating a first plurality of grounding decisions based on the source sentence, the source image, and a trained phrase grounding model that sequentially maps each phrase included in a sentence to a plurality of grounding decisions based on any unmapped phrases included in the sentence, and performing on or more comparison operations on the plurality of grounding decisions to determine that a first grounding decision included in the plurality of grounding decisions indicates that the first phrase matches the first region.

5. The computer-implemented method of any of clauses 1-4, further comprising performing one or more machine learning operations on an untrained phrase grounding model to generate the trained phrase grounding model.

6. The computer-implemented method of any of clauses 1-5, further comprising performing one or more pre-training operations on an untrained phrase encoder and an untrained visual encoder to generate a pre-trained phrase encoder and a pre-trained visual encoder; and performing one or more training operations on an untrained phrase grounding model that includes both the pre-trained phrase encoder and the pre-trained visual encoder to generate the trained phrase grounding model.

7. The computer-implemented method of any of clauses 1-6, wherein determining that the first phrase matches the first region comprises performing one or more object detection operations on the source image to generate a sequence of bounding boxes, wherein a first bounding box included in the sequence of bounding boxes defines the first region; and determining that the first phrase matches the first bounding box based on the first phrase, the at least the second phrase, and the sequence of bounding boxes.

8. The computer-implemented method of any of clauses 1-7, wherein determining that the first phrase matches the first region comprises applying a state of a recurrent neural network (RNN) to a neural network (NN) to generate a grounding decision.

9. The computer-implemented method of any of clauses 1-8, wherein determining that the first phrase matches the first region comprises applying a first state of a first recurrent neural network (RNN) and a second state of a second RNN to a first neural network (NN) to generate a grounding decision.

10. The computer-implemented method of any of clauses 1-9, wherein determining that the first phrase matches the first region comprises applying a first state of a first recurrent neural network (RNN), a second state of a second RNN, and a third state of a bi-directional RNN to a first neural network (NN) to generate a grounding decision.

11. In some embodiments, one or more non-transitory computer readable media include instructions that, when executed by one or more processors, cause the one or more processors to perform automated phrase grounding operations by performing the steps of determining that a first phrase included in a source sentence matches a first region of a source image based on the first phrase and at least a second phrase included in the source sentence; and generating a first matched pair that specifies the first phrase and the first region, wherein one or more annotation operations are subsequently performed on the source image based on the first matched pair.

12. The one or more non-transitory computer readable media of clause 11, further comprising determining that the first phrase matches a second region of the source image based on the first phrase and the at least the second phrase; and generating a second matched pair that specifies the first phrase and the second region, wherein one or more annotation operations are subsequently performed on the source image based on the second matched pair.

13. The one or more non-transitory computer readable media of clause 11 or 12, further comprising determining that the second phrase matches a second region included in the source image based on the second phrase and the first matched pair; and generating a second matched pair that specifies the second phrase and the second region, wherein one or more annotation operations are subsequently performed on the source image based on the second matched pair.

14. The one or more non-transitory computer readable media of any of clauses 11-13, wherein determining that the first phrase matches the first region comprises generating a first plurality of grounding decisions based on the source sentence, the source image, and a trained phrase grounding model that sequentially maps each phrase included in a sentence to a plurality of grounding decisions; and performing on or more comparison operations on the plurality of grounding decisions to determine that a first grounding decision included in the plurality of grounding decisions indicates that the first phrase matches the first region.

15. The one or more non-transitory computer readable media of any of clauses 11-14, further comprising performing one or more machine learning operations on an untrained phrase grounding model to generate the trained phrase grounding model.

16. The one or more non-transitory computer readable media of any of clauses 11-15, further comprising performing one or more object detection operations on the source image to determine the first region.

17. The one or more non-transitory computer readable media of any of clauses 11-16, wherein determining that the first phrase matches the first region comprises applying a state of a stacked long short-term memory recurrent network to a neural network (NN) to generate a grounding decision.

18. The one or more non-transitory computer readable media of any of clauses 11-17, wherein determining that the first phrase matches the first region comprises applying a first state of a first recurrent neural network (RNN) and a second state of a second RNN to a first neural network (NN) to generate a grounding decision.

19. The one or more non-transitory computer readable media of any of clauses 11-18, wherein determining that the first phrase matches the first region comprises applying a first state of a first recurrent neural network (RNN), a second state of a second RNN, and a third state of a bi-directional RNN to a first neural network (NN) to generate a grounding decision.

20. In some embodiments a system comprises one or more memories storing instructions; and one or more processors that are coupled to the one or more memories and, when executing the instructions, are configured to determine that a first phrase included in a source sentence matches a first region of a source image based on the first phrase and at least a second phrase included in the source sentence; and generate a first matched pair that specifies the first phrase and the first region, wherein one or more annotation operations are subsequently performed on the source image based on the first matched pair.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing automated phrase grounding operations, the computer-implemented method comprising:
    extracting, from a source sentence, a first phrase and a second phrase;
    executing a first encoder neural network that generates, based on the first phrase, a first encoding of the first phrase and, based on the second phrase, a second encoding of the second phrase;
    executing one or more neural networks to convert a plurality of bounding boxes for a plurality of objects included in a source image into a plurality of box states corresponding to the plurality of bounding boxes, wherein each box state included in the plurality of box states encodes one or more interrelationships between a corresponding bounding box included in the plurality of bounding boxes and one or more additional bounding boxes included in the plurality of bounding boxes;
    executing a decision neural network to generate a first plurality of grounding decisions based on input that includes (i) a first box state that is included in the plurality of box states and corresponds to a first bounding box included in the plurality of bounding boxes, (ii) the first encoding, and (iii) the second encoding;
    performing one or more comparisons using the first plurality of grounding decisions and a decision threshold to determine that a first grounding decision included in the first plurality of grounding decisions indicates that the first phrase matches the first bounding box;
    generating a first matched pair that specifies the first phrase and the first bounding box; and
    causing one or more annotation operations to be performed on the source image based on the first matched pair.

2. The computer-implemented method of claim 1, further comprising:
    determining that the first phrase matches a second bounding box included in the plurality of bounding boxes based on (i) a second box state that is included in the plurality of box states and corresponds to the second bounding box, (ii) the first encoding, and (iii) the second encoding; and
    generating a second matched pair that specifies the first phrase and the second bounding box, wherein the one or more annotation operations are further performed on the source image based on the second matched pair.

3. The computer-implemented method of claim 1, further comprising:
    determining that the second phrase matches the first bounding box based on (i) the first box state, (ii) the second phrase, and (iii) the first matched pair; and
    generating a second matched pair that specifies the second phrase and the first bounding box, wherein the one or more annotation operations are further performed on the source image based on the second matched pair.

4. The computer-implemented method of claim 1, wherein executing the decision neural network comprises generating the first plurality of grounding decisions based on the source sentence, the source image, and a trained phrase grounding model that includes the decision neural network and sequentially maps each phrase included in a sentence to a second plurality of grounding decisions based on any unmapped phrases included in the sentence.

5. The computer-implemented method of claim 4, further comprising performing one or more machine learning operations on an untrained phrase grounding model to generate the trained phrase grounding model.

6. The computer-implemented method of claim 4, further comprising:
    performing one or more pre-training operations on an untrained phrase encoder and an untrained visual encoder to generate a pre-trained phrase encoder and a pre-trained visual encoder; and performing one or more training operations on an untrained phrase grounding model that includes both the pre-trained phrase encoder and the pre-trained visual encoder to generate the trained phrase grounding model.

7. The computer-implemented method of claim 1, further comprising:
performing one or more object detection operations on the source image to generate the plurality of bounding boxes.

8. The computer-implemented method of claim 1, wherein the first box state comprises a hidden state of a bidirectional recurrent neural network (RNN) included in the one or more neural networks.

9. The computer-implemented method of claim 1 wherein the input further includes a phrase state that encodes contextual information associated with the second phrase.

10. The computer-implemented method of claim 1, wherein the input further includes a history state that encodes contextual information associated with one or more previous grounding decisions between the source sentence and the source image.

11. One or more non-transitory computer readable media including instructions that, when executed by one or more processors, cause the one or more processors to perform automated phrase grounding operations by performing the steps of:
extracting, from a source sentence, a first phrase and a second phrase;
executing a first encoder neural network that generates, based on the first phrase, a first encoding of the first phrase and, based on the second phrase, a second encoding of the second phrase;
executing one or more neural networks to convert a plurality of bounding boxes for a plurality of objects included in a source image into a plurality of box states corresponding to the plurality of bounding boxes, wherein each box state included in the plurality of box states encodes one or more interrelationships between a corresponding bounding box included in the plurality of bounding boxes and one or more additional bounding boxes included in the plurality of bounding boxes;
executing a decision neural network to generate a first plurality of grounding decisions based on input that includes (i) a first box state that is included in the plurality of box states and corresponds to a first bounding box included in the plurality of bounding boxes, (ii) the first encoding, and (iii) the second encoding;
performing one or more comparisons using the first plurality of grounding decisions and a decision threshold to determine that a first grounding decision included in the first plurality of grounding decisions indicates that the first phrase matches the first bounding box;
generating a first matched pair that specifies the first phrase and the first bounding box; and
causing one or more annotation operations to be performed on the source image based on the first matched pair.

12. The one or more non-transitory computer readable media of claim 11, further storing instructions that, when executed by the one or more processors, cause the one or more processors to perform the steps of:
determining that the first phrase matches a second bounding box included in the plurality of bounding boxes based on the first encoding and the second encoding; and
generating a second matched pair that specifies the first phrase and the second bounding box, wherein the one or more annotation operations are further performed on the source image based on the second matched pair.

13. The one or more non-transitory computer readable media of claim 11, further storing instructions that, when executed by the one or more processors, cause the one or more processors to perform the steps of:
determining that the second phrase matches a second bounding box included in the plurality of bounding boxes based on the second phrase and the first matched pair; and
generating a second matched pair that specifies the second phrase and the second bounding box, wherein the one or more annotation operations are further performed on the source image based on the second matched pair.

14. The one or more non-transitory computer readable media of claim 11, wherein executing the decision neural network comprises generating the first plurality of grounding decisions based on the source sentence, the source image, and a trained phrase grounding model that includes the decision neural network and sequentially maps each phrase included in a sentence to a second plurality of grounding decisions.

15. The one or more non-transitory computer readable media of claim 14, further storing instructions that, when executed by the one or more processors, cause the one or more processors to perform the steps of:
performing one or more machine learning operations on an untrained phrase grounding model to generate the trained phrase grounding model.

16. The one or more non-transitory computer readable media of claim 11, further storing instructions that, when executed by the one or more processors, cause the one or more processors to perform the steps of:
performing one or more object detection operations on the source image to determine the plurality of bounding boxes.

17. The one or more non-transitory computer readable media of claim 11, wherein executing the one or more neural networks comprises:
executing a visual encoder included in the one or more neural networks to convert the plurality of bounding boxes into a plurality of image feature lists; and
executing a bidirectional long short-term memory recurrent network included in the one or more neural networks to convert the plurality of image feature lists and a plurality of location lists associated with the plurality of bounding boxes into the plurality of box states.

18. The one or more non-transitory computer readable media of claim 11, wherein the input further comprises at least one of (i) a phrase state that encodes contextual information associated with the second phrase, or (ii) a history state that encodes contextual information associated with one or more previous grounding decisions between the source sentence and the source image.

19. The one or more non-transitory computer readable media of claim 18, wherein the phrase state is generated by a first recurrent neural network (RNN), and the history state is generated by a second RNN.

20. A system, comprising:
one or more memories storing instructions; and
one or more processors that, when executing the instructions, are configured to:
extract, from a source sentence, a first phrase and a second phrase;

execute a first encoder neural network that generates, based on the first phrase, a first encoding of the first phrase and, based on the second phrase, a second encoding of the second phrase;

execute one or more neural networks to convert a plurality of bounding boxes for a plurality of objects included in a source image into a plurality of box states corresponding to the plurality of bounding boxes, wherein each box state included in the plurality of box states encodes one or more interrelationships between a corresponding bounding box included in the plurality of bounding boxes and one or more additional bounding boxes included in the plurality of bounding boxes;

execute a decision neural network to generate a first plurality of grounding decisions based on input that includes (i) a first box state that is included in the plurality of box states and corresponds to a first bounding box included in the plurality of bounding boxes, (ii) the first encoding, and (iii) the second encoding;

perform one or more comparisons using the first plurality of grounding decisions and a decision threshold to determine that a first grounding decision included in the first plurality of grounding decisions indicates that the first phrase matches the first bounding box;

generate a first matched pair that specifies the first phrase and the first bounding box; and cause one or more annotation operations to be performed on the source image based on the first matched pair.

\* \* \* \* \*